(12) United States Patent
Galera et al.

(10) Patent No.: US 10,882,495 B2
(45) Date of Patent: Jan. 5, 2021

(54) SYSTEM AND METHOD FOR CLEANING A VEHICLE-MOUNTED SENSOR

(71) Applicant: FICO TRANSPAR, S.A., Barcelona (ES)

(72) Inventors: Robert López Galera, Barcelona (ES); Miguel Mota López, Barcelona (ES); Carlos Esteller Pitarch, Barcelona (ES); Jose Manuel Espinosa, Barcelona (ES); Olallo Alcaide Hernández, Barcelona (ES); Cristian Rodríguez Estévez, Barcelona (ES)

(73) Assignee: FICO TRANSPAR, S.A., Barcelona (ES)

( * ) Notice: Subject to any disclaimer, the term of this patent is extended or adjusted under 35 U.S.C. 154(b) by 150 days.

(21) Appl. No.: 15/350,782

(22) Filed: Nov. 14, 2016

(65) Prior Publication Data
US 2017/0313286 A1    Nov. 2, 2017

Related U.S. Application Data

(63) Continuation-in-part of application No. 14/721,331, filed on May 26, 2015, now Pat. No. 10,286,877.

(30) Foreign Application Priority Data

May 27, 2014  (EP) ..................................... 14382188

(51) Int. Cl.
*B60S 1/56* (2006.01)
*B60S 1/48* (2006.01)
(Continued)

(52) U.S. Cl.
CPC .................. *B60S 1/56* (2013.01); *B08B 3/02* (2013.01); *B08B 5/02* (2013.01); *B08B 7/04* (2013.01);
(Continued)

(58) Field of Classification Search
CPC .......... F04B 9/107; F04B 43/00; F04B 43/06; F04B 43/073; F04B 45/02; F04B 45/053;
(Continued)

(56) References Cited

U.S. PATENT DOCUMENTS

| | | | | |
|---|---|---|---|---|
| 2,902,944 A | * | 9/1959 | Etten ....................... | F04B 43/06 417/389 |
| 2004/0005230 A1 | * | 1/2004 | Vockroth ................ | F03C 1/013 417/401 |

(Continued)

FOREIGN PATENT DOCUMENTS

| | | |
|---|---|---|
| DE | 10332939 A1 | 2/2005 |
| WO | 2014017015 A1 | 1/2014 |

OTHER PUBLICATIONS

European Search Report for corresponding application EP14382188; Report dated Nov. 6, 2014.

*Primary Examiner* — David G Cormier
(74) *Attorney, Agent, or Firm* — Cantor Colburn LLP

(57) ABSTRACT

An aspect of the invention refers to a system for cleaning an external vehicle-mounted sensor surface. The system comprises an air nozzle arranged to discharge air onto a sensor surface; an air pump comprising a fluid inlet, an air outlet, an air-fluid interface and a variable volume compression chamber communicated with the air outlet; an air flow control device communicated with the air nozzle and the air outlet for controlling the flow of air therethrough; and a liquid pump communicated with the fluid inlet to supply a flow of pressurized liquid such that the volume of the compression chamber varies to generate a volume of pressurized air with an absolute pressure below 10 bar.

9 Claims, 12 Drawing Sheets

(51) Int. Cl.
- *B60S 1/54* (2006.01)
- *B08B 3/02* (2006.01)
- *B08B 5/02* (2006.01)
- *B08B 7/04* (2006.01)
- *G02B 27/00* (2006.01)
- *B60S 1/52* (2006.01)
- *F04B 9/107* (2006.01)
- *F04B 45/02* (2006.01)
- *F04B 45/053* (2006.01)
- *F04B 43/073* (2006.01)
- *F04B 43/06* (2006.01)
- *F04B 43/00* (2006.01)
- *F04B 13/02* (2006.01)

(52) U.S. Cl.
CPC .............. *B60S 1/481* (2013.01); *B60S 1/52* (2013.01); *B60S 1/54* (2013.01); *F04B 9/107* (2013.01); *F04B 13/02* (2013.01); *F04B 43/00* (2013.01); *F04B 43/06* (2013.01); *F04B 43/073* (2013.01); *F04B 45/02* (2013.01); *F04B 45/053* (2013.01); *G02B 27/0006* (2013.01)

(58) Field of Classification Search
CPC .......... B60S 1/0848; B60S 1/52; B60S 1/522; B60S 1/524; B60S 1/528; B60S 1/54; B60S 1/544; B60S 1/546; B60S 1/56; B60S 1/481; B60S 1/48; B60S 1/50; B08B 3/02; B08B 5/02; B08B 7/04; B08B 2203/027; B08B 2205/00; B05B 9/0413; G02B 27/0006

See application file for complete search history.

(56) References Cited

U.S. PATENT DOCUMENTS

| | | |
|---|---|---|
| 2004/0084069 A1 | 5/2004 | Woodard |
| 2005/0121539 A1 | 6/2005 | Takada et al. |
| 2007/0240278 A1* | 10/2007 | MacDonald .............. B08B 5/02 15/405 |
| 2009/0250533 A1 | 10/2009 | Akiyama et al. |
| 2013/0092758 A1 | 4/2013 | Tanaka |
| 2015/0343999 A1 | 12/2015 | Lopez Galera et al. |
| 2017/0182980 A1* | 6/2017 | Davies ................. B60S 1/0848 |

\* cited by examiner

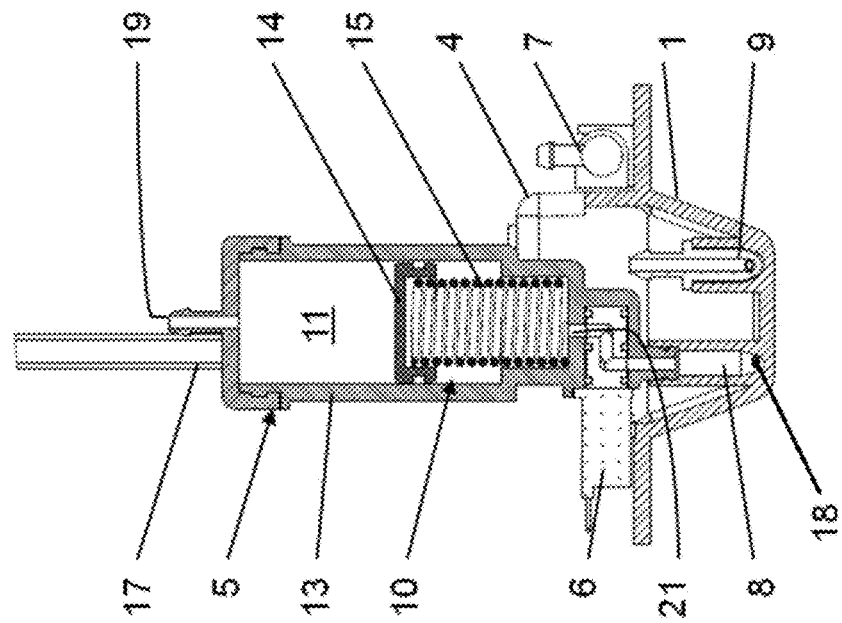
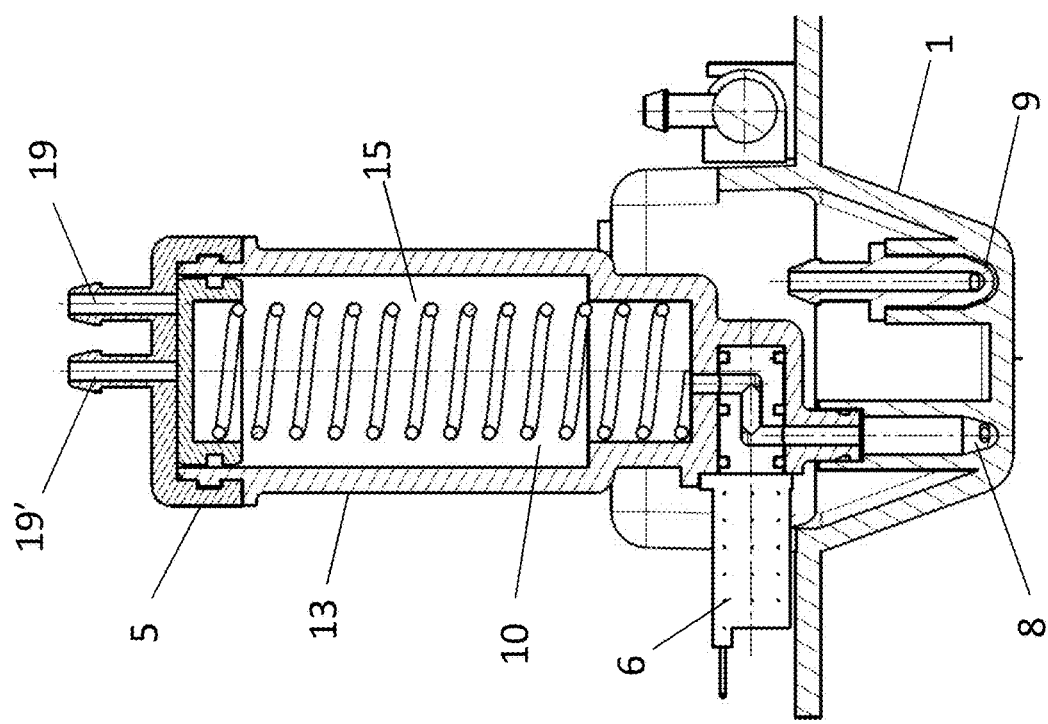
FIG. 11
FIG. 12

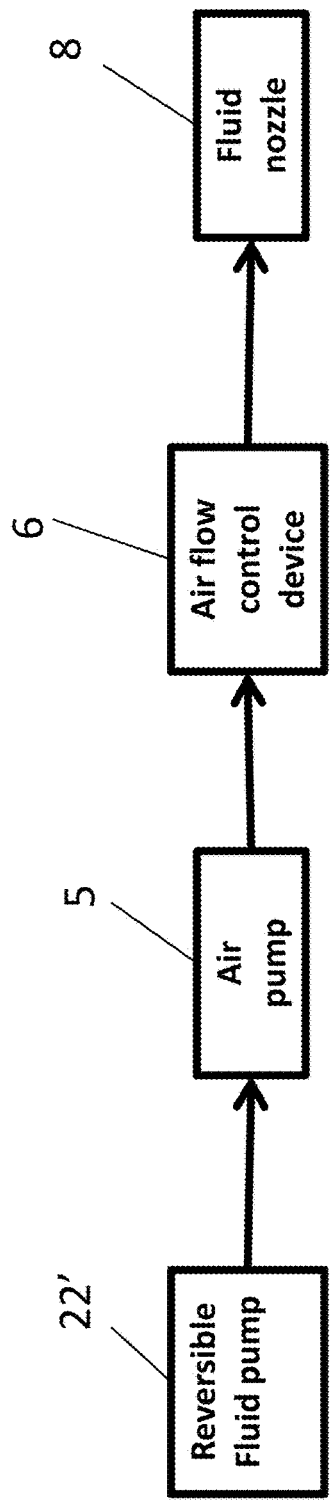
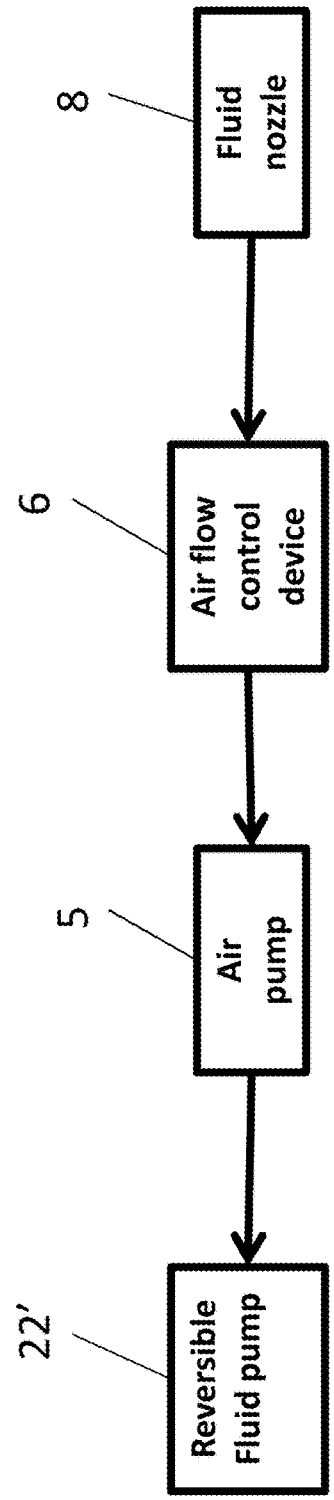
FIG. 16A
FIG. 16B

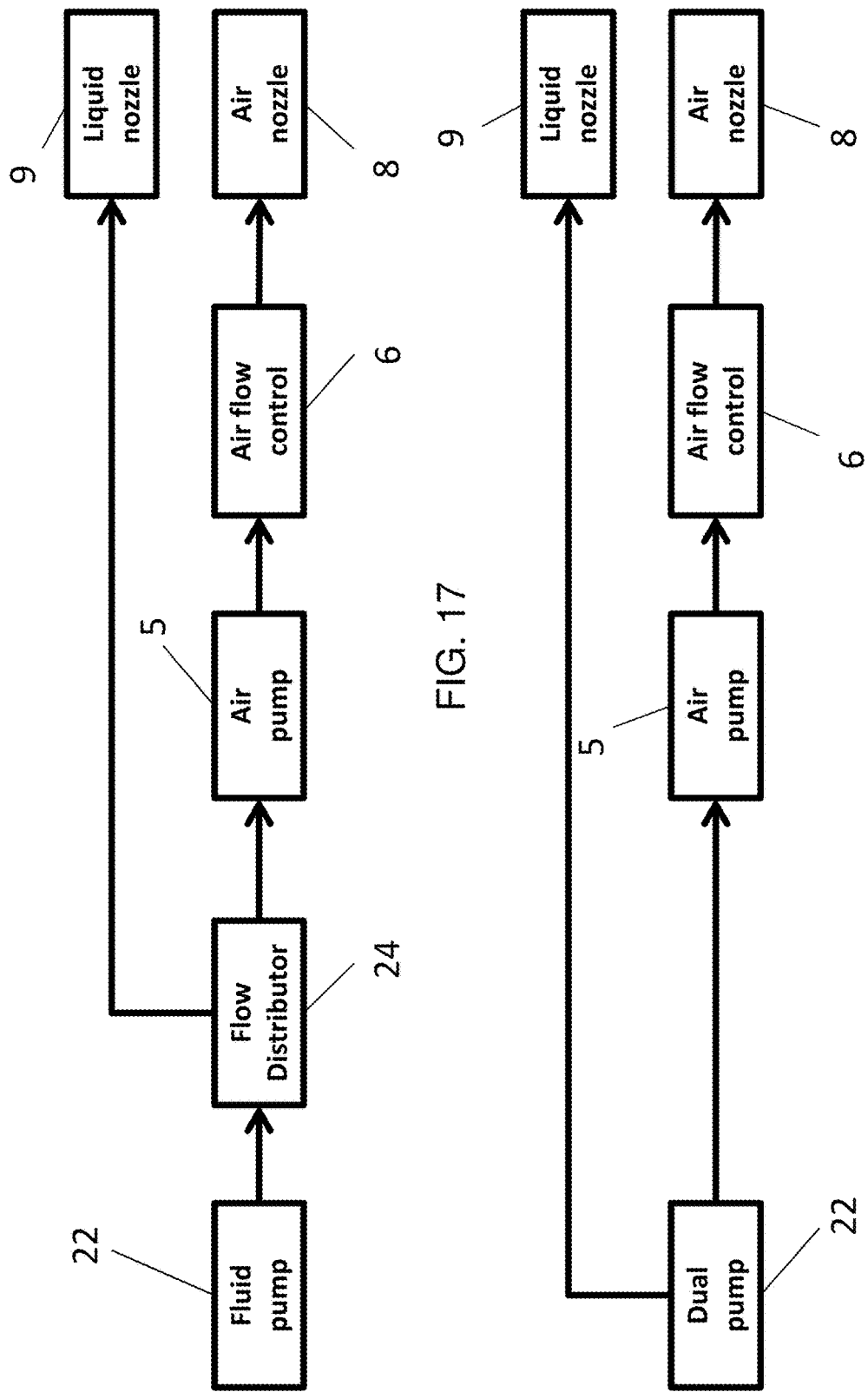

SYSTEM AND METHOD FOR CLEANING A VEHICLE-MOUNTED SENSOR

CROSS-REFERENCES TO RELATED APPLICATIONS

This patent application is a continuation-in-part of U.S. patent application Ser. No. 14/721,331, filed May 26, 2015, which claims priority to European Application No. 14382188.2, filed May 27, 2014. This patent application also claims priority to PCT Application No. PCT/EP2015/076546, filed Nov. 13, 2015. All of the aforementioned patent applications are incorporated herein by reference in their entirety.

BACKGROUND OF THE INVENTION

The present invention refers in general to techniques for automatically cleaning a surface of a sensor mounted on a vehicle by blowing air to remove light dirt (e.g. dust) from the surface or remove liquid drops on the surface (e.g. due to rain or washing) such that a clear signal can be captured anytime.

More in particular, it is an object of the present invention to provide a system for automatically cleaning a sensor surface which, in a simple manner and with a reduced cost, is capable of completing the cleaning process quickly and satisfactorily.

At present, motor vehicles are commonly fitted with sensors to assist drivers in diverse traffic situations, such as, but not limited to, parking assistance, blind zone object detection, traffic lane departure, traffic signal identification or rear-view mirror substitution.

Generally, these sensors are fitted on a vehicle's exterior surface such that a sensor surface is exposed to dirt, which reduces the quality of the captured signal. Hence, there is a need to remove a foreign matter stuck onto a surface of a vehicle-mounted sensor; need that is further increased when the sensor is an optic sensor having a lens surface exposed to dirt, directly or indirectly, such as a vehicle-mounted parking camera.

There are various types of washing devices to wash an exposed surface of an in-vehicle mounted camera (e.g. a lens or a cover window) and which are conventionally equipped with a high-pressure air generation device, which generates high-pressure wash water by using high-pressure air and sprays the high-pressure wash water on the exposed surface of the camera to wash and clean it.

The problem with these devices is that, until the wash water has fully evaporated, the driver of the vehicle perceives a blurry image due to the remaining wash water on the exposed surface of the camera. This is particularly inconvenient when the driver desires to park and notices that the camera is dirty. The driver then uses the device to wash the dirt off, but has to wait until it has fully evaporated to perceive a clear image. Therefore, the parking assistance system cannot be immediately used after washing it with this kind of devices.

In case of light dirt (e.g. dust) or less stringent cleaning requirements, a blast of air is sufficient to clean the exposed surface. Generally, sensors that do not require capturing an image, such as electromagnetic or ultrasonic parking sensors, are those with less stringent cleaning requirements.

To solve these problems, there are known devices which use a blast of air to dry the remaining washing water on the exposed surface. These devices may also be operated to only blast air in case of light dirt or to dry the exposed surface without washing it.

However, these devices are usually based in motor driven air pumps, which are complex, noisy, expensive, bulky and heavy equipment. These features make these devices inappropriate for automotive use and there is a need to provide an alternative solution to these problems.

SUMMARY OF THE INVENTION

Therefore, it is an object of the invention to provide a system for cleaning a vehicle-mounted sensor surface exposed to dirt that is capable of completing a cleaning process quickly and with a reduced number of components.

An aspect of the invention refers to a system for cleaning an external vehicle-mounted sensor surface. The system comprises an air nozzle arranged to discharge air onto a sensor surface; an air pump comprising a fluid inlet, an air outlet, an air-fluid interface and a variable volume compression chamber communicated with the air outlet; an air flow control device communicated with the air nozzle and the air outlet for controlling the flow of air therethrough; and a liquid pump communicated with the fluid inlet to supply a flow of pressurized liquid such that the volume of the compression chamber varies to generate a volume of pressurized air with an absolute pressure value below 10 bar.

The technical effect and advantage of the above-described configuration is that generation of pressurized air is performed with a simple, low-noise, cheap, small and lightweight equipment.

Another advantage of this configuration is that the liquid pump may be used to supply pressurized liquid to other vehicle components. For example, part of the pressurized washing liquid flow supplied by a liquid pump used in another washing system (e.g. headlight, front windshield or rear windshield washing systems) to a liquid nozzle arranged to discharge washing liquid onto another vehicle surface (e.g. headlight, front windshield or rear windshield) may be branched out and supplied at the air pump fluid inlet.

Therefore, one liquid pump is capable of generating pressurized liquid for several vehicle applications such that several functions may be implemented with a reduced number of components. Therefore, the system is implemented in a very cost-effective manner.

The flow of pressurized liquid may be supplied at a manometric pressure in the range of 0.5 bar to 9 bar at a liquid pump outlet.

In specific embodiments of the invention, the sensor surface may be transparent to electromagnetic radiation. More specifically, the sensor surface may be transparent to infrared radiation, visible radiation, ultraviolet radiation or any combination thereof. In other words, the sensor surface may allow electromagnetic radiation to pass therethrough.

The air pump may be provided with a variable volume fluid chamber. This chamber is communicated with the fluid inlet and the air-fluid interface is arranged to separate the fluid and compression chambers from each other. The fluid chamber is configured such that the flow of pressurized liquid varies its volume. Volume variation of the liquid chamber causes volume variation of the compression chamber to generate a volume of pressurized air with an absolute pressure value below 10 bar.

The flow of pressurized liquid may increase the volume of the fluid chamber. The volume increase of the fluid chamber may cause volume reduction of the compression chamber.

The volume of the compression chamber may be reduced to generate a volume of pressurized air with an absolute pressure value below 10 bar.

The air pump may be provided with a body. The air-fluid interface may be connected to the body such that the compression chamber is defined by the body and the air-fluid interface. The body may be formed as a one-piece element or may be formed as an assembly of separate parts.

The air-fluid interface may be a plunger arranged in sliding contact with the body. In this case, the compression chamber is defined by the body and the plunger. The plunger is configured to slide within the body with the flow of pressurized liquid. In that situation, the plunger slides within the body and varies the volume of the compression chamber; preferably, the plunger reduces the volume of the compression chamber when displaced by the pressurized liquid. The plunger may be biased towards the fluid inlet by a spring housed in the body.

The air-fluid interface may be an elastic element attached to the body. In this case, the compression chamber is defined by the body and the elastic element. The elastic element is configured to deform with the flow of pressurized liquid. In that situation, the elastic element deforms and varies the volume of the compression chamber; preferably, the elastic element reduces the volume of the compression chamber when deformed by the flow of pressurized liquid. The elastic element may be an elastic membrane. The elastic element may comprise a bellow-shaped portion that serves to bias the elastic element towards the fluid inlet. The elastic element may be made of an elastomeric material.

The air-fluid interface may be arranged to split the body into a first and a second portion. For example, the plunger or the elastic element may be arranged to split the body into first and second portions. In this configuration, the compression chamber is defined by the first portion of the body and the air-fluid interface, whereas the fluid chamber is defined by the second portion of the body and the air-fluid interface.

The air pump may be provided with a one-way valve communicated with the compression chamber. This one-way valve allows air to enter into the compression chamber during expansion of the same and prevents air from entering into the chamber during compression of the same.

Compressing a volume of air and discharging it onto the sensor surface is carried out by a control unit operatively associated with the air flow control device and with the liquid pump. The control unit first closes the air flow control device and activates the liquid pump to supply pressurized liquid during a predetermined period of time to generate a volume of pressurized air within the compression chamber. Next, the air flow control device is opened such that at least one blast of pressurized air is applied onto the sensor surface to blow off dust or any drop of liquid from the sensor surface. The control unit then deactivates the liquid pump such that the compression chamber is refilled with non-compressed air. Finally, the control unit closes the air flow control device. In case a one-way valve is provided, the liquid pump and the air flow control device are closed at the same time by the control unit as the compression chamber is refilled with non-compressed air through the one-way valve.

The cleaning system may also comprise a washing liquid nozzle arranged to discharge washing liquid onto the sensor surface. A liquid flow control device may also be provided in communication with the washing liquid nozzle for controlling the flow of liquid therethrough. A liquid pump may supply pressurized washing liquid to the liquid flow control device.

Preferably, washing liquid is pressurized by the same liquid pump that supplies pressurized liquid to the air pump. Thus, the liquid pump may supply pressurized washing liquid to both the air pump liquid inlet and the liquid flow control device.

Dispensing the washing liquid and the air blow in a coordinated manner is carried out by the control unit operatively associated with the air flow control device, the liquid flow control device and the liquid pump. The control unit is adapted to perform different cleaning cycles. In a preferred cleaning cycle, the control unit first closes the air flow control device, opens the liquid flow control device and activates the liquid pump to supply pressurized washing liquid during a predetermined period of time. Next, the control unit closes the liquid flow control device to generate a volume of pressurized air within the compression chamber. The control unit then opens the air flow control device such that at least one blast of pressurized air is applied onto the sensor surface to blow off any drop of washing liquid from the sensor surface. Subsequently, the control unit deactivates the liquid pump such that the compression chamber is refilled with non-compressed air. Finally, the control unit closes the air flow control device. In case a one-way valve is provided, the liquid pump and the air flow control device are closed at the same time by the control unit as the compression chamber is refilled with non-compressed air through the one-way valve.

This cleaning system efficiently removes foreign matter strongly adhered onto the sensor surface with reduced washing fluid consumption and ensures that any drop of washing liquid on the sensor surface which may impair capturing a quality signal, is quickly removed and the cleaning time is therefore reduced.

The system may be provided with a housing having an opening adapted to fit the sensor surface. The air nozzle and/or the liquid nozzle may be fixedly or movably attached to the housing. In other words, the air and/or liquid nozzles may be fixed or movable nozzles. At least one of the air pump, the air flow control device and the liquid flow control device may be attached to the housing.

Movable nozzles are configured to move from a non-operative position to an operative position. In the non-operative position the movable nozzles are at least partially hidden in the housing, whereas in the operative position the movable nozzles are arranged to discharge fluid onto the sensor surface.

BRIEF DESCRIPTION OF THE DRAWINGS

Non-limiting examples of the present disclosure will be described in the following, with reference to the appended drawings, in which:

FIG. 11 shows a sectional view of another embodiment of the cleaning system of the invention.

FIG. 12 shows a sectional view of another embodiment of the cleaning system of the invention.

FIG. 15A shows the cleaning system in an initial phase; FIG. 15B shows the system during a compression extension phase; and FIG. 15C shows the system during an air ejection phase.

FIGS. 16A-16B show a schematic representation of another embodiment of the cleaning system of the invention incorporating a reversible fluid pump; wherein FIG. 16A shows the system operating in normal mode; and FIG. 16B shows the system operating in reverse mode.

FIG. 17 shows a schematic representation of another embodiment of the cleaning system of the invention.

FIG. 18 shows a schematic representation of another embodiment of the cleaning system of the invention.

The embodiments illustrated as a schematic representations in FIGS. 13 to 18, can be implemented as shown in any of the embodiments of FIGS. 1 to 10.

DETAILED DESCRIPTION OF THE INVENTION

Figure 1:
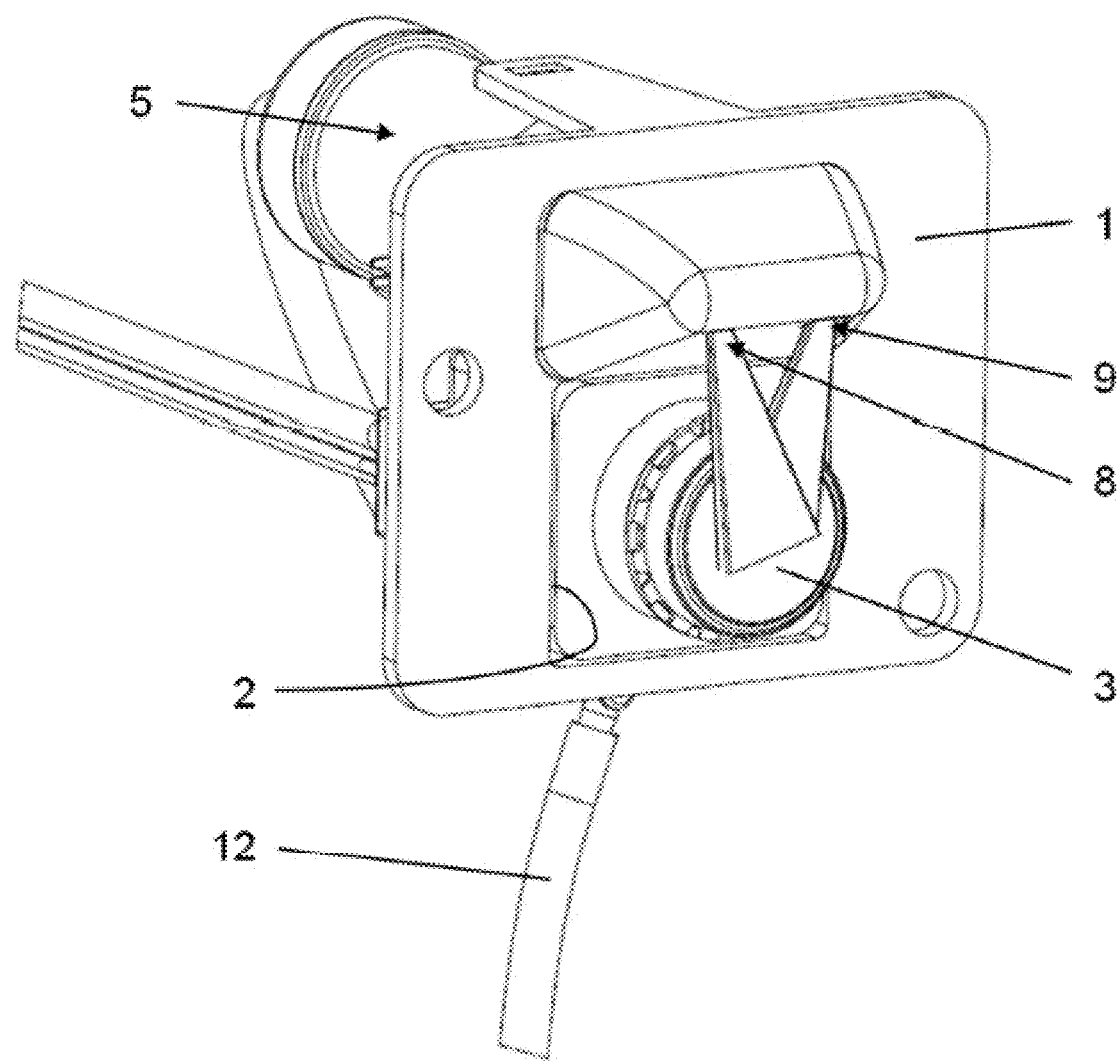
FIGS. 1 and 2 show, respectively, front elevational and perspective views of a cleaning system according to an example of the invention.
Figure 2:
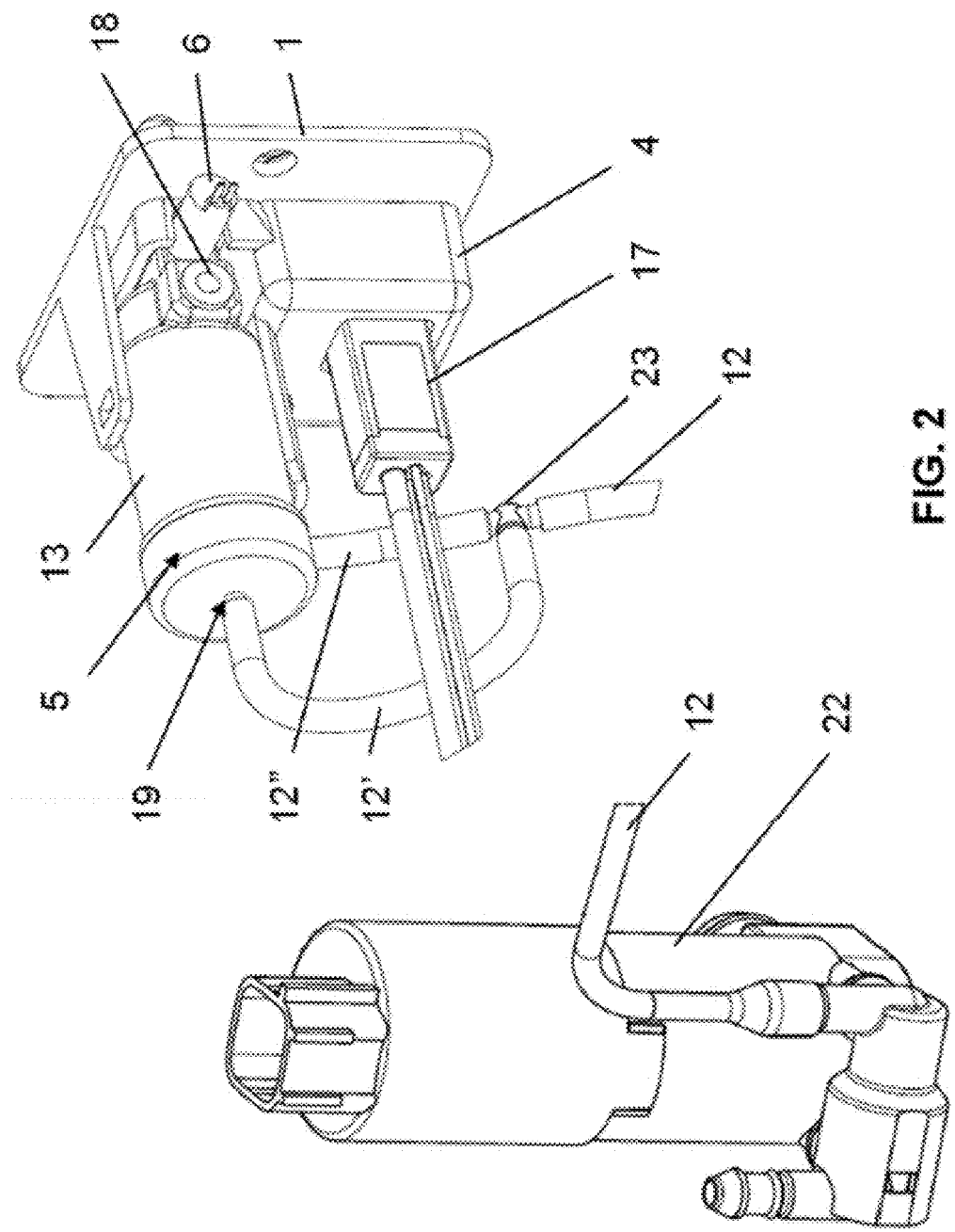

FIGS. 1 and 2 show a support 1, preferably made of a plastic material, suitable to be fitted in an automobile surface. The support 1 has an opening 2 and a sensor surface 3, a camera lens in this example, mounted at that opening 2, and a video camera (not shown) inside a housing 4 of the support 1 and operatively arranged with respect to the camera lens 3. Additionally, an air pump 5, an air control device 6 and a liquid control device 7, are also mounted in the support 1. Preferably, the air control device 6 and the liquid control device 7 are implemented in this example by means of first and second electrovalves, respectively.

A liquid nozzle 9 and an air nozzle 8 are mounted at an outer surface of the support 1 as shown in the figure, and they are arranged to respectively dispense washing liquid and a blast of air on the camera lens 3.

The first electrovalve 6 is communicated with the air nozzle 8 and with the air pump 5 for opening and closing the flow of air provided by the air pump 5 through the air nozzle 8. Similarly, the second electrovalve 7 is communicated with the liquid nozzle 9 and with a washing liquid conduit 12 for opening and closing the flow of washing liquid through the liquid nozzle 9.

An electric connector 17 is also coupled with the support 1 for the electrical connection of the video camera or any other sensor with an external equipment (not shown).

Figure 3:
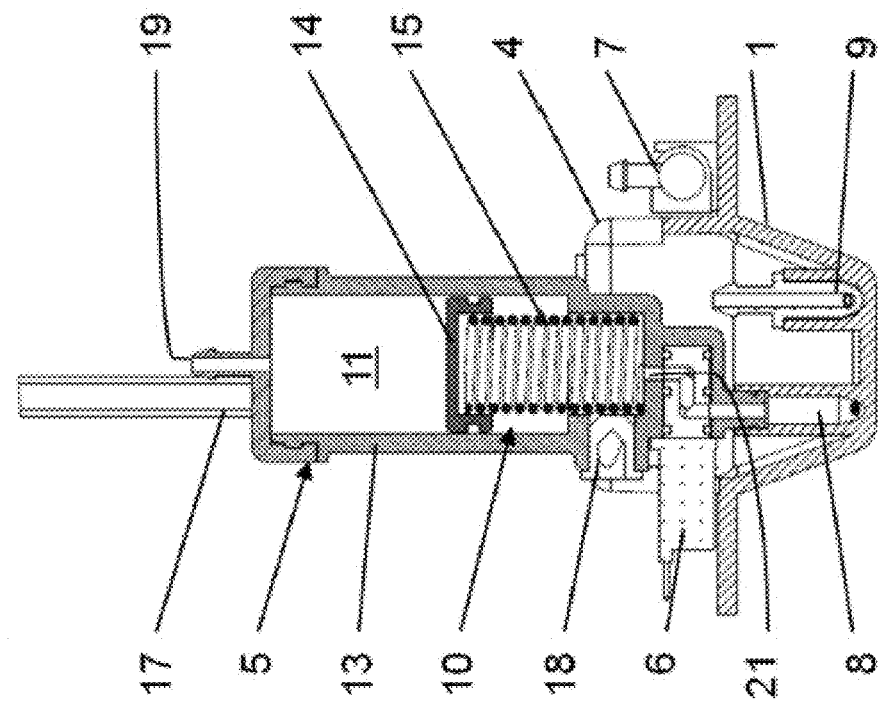
FIGS. 3 and 4 show a sectional view of a first embodiment of the air pump in a non-operative state and in an operative state, respectively.
Figure 4:
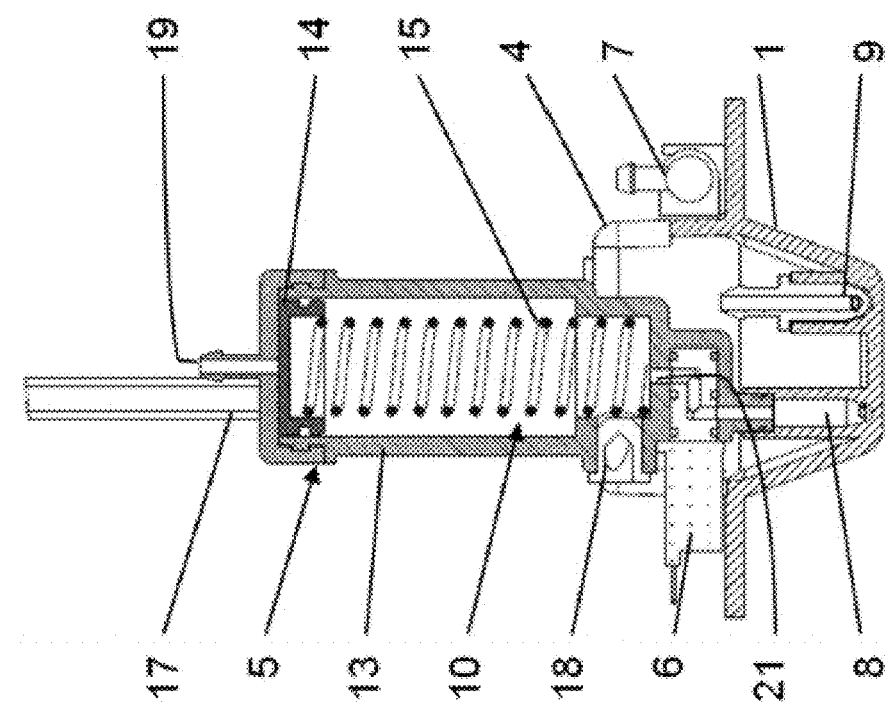

FIGS. 3 and 4 show a first embodiment of the air pump 5 having a body 13 and an air-fluid interface housed inside the body. In this example, the body 13 is a cylinder having a fluid inlet 19 (i.e., liquid inlet) and an air outlet 21 and the air-fluid interface is a displaceable plunger 14. The plunger 14 splits the cylinder 13 into first and second portions such that a compression chamber 10 is defined by the first portion of the cylinder 13 and the plunger 14 and a fluid chamber 11 is defined by the second portion of the cylinder 13 and the plunger 14. A spring coil 15 is housed within the first portion of the cylinder 13 such that the plunger 14 is biased by the spring coil 15 towards the fluid inlet 19.

Alternatively, the spring coil 15 may be housed within the second portion of the cylinder 13 and arranged so as to bias the plunger 14 towards the fluid inlet opening 19.

The spring coil 15 is arranged to enlarge the volume of the compression chamber 10 after the air pump 5 has dispensed a blast of air. A one-way valve 18, mounted in the cylinder 13 and communicated with the compression chamber 10, is configured to allow air to enter into the compression chamber 10 during expansion of the compression chamber 10, and to prevent air from entering into the chamber 10 during compression of the compression chamber 10. Preferably, this one-way valve 18 is made of an elastic material and has a conical shape, where its narrower end has an opening and is placed inside the cylinder 13.

The washing liquid conduit 12 is additionally communicated with the fluid inlet 19, such that the air pump 5 can be operated by a flow of pressurized washing liquid supplied thereto. More in particular, the washing liquid conduit 12 is connected with a T-junction connector 23 such that a first branch 12' of the conduit 12 is connected with the connector 23 and with the fluid inlet 19 of the air pump 5 and a second branch 12" is connected with the connector 23 and with the second electrovalve 7. In this way, a flow of pressurized washing liquid generated by a liquid pump 22 is supplied both to the air pump 5 and to the second electrovalve 7.

As a vehicle user activates the cleaning system, a control unit implemented by means of a programmable electronic device, electrically communicated with the first and second electrovalves 6, 7 and the liquid pump 22, is adapted or programmed to carry out a cleaning cycle, in which first the liquid pump 22 is activated to pump washing liquid from a washing liquid reservoir to the washing liquid conduit 12 generating a flow of washing liquid. The second electrovalve 7 in this first stage of the cleaning cycle is open, so that a burst of washing liquid is dispensed through the liquid nozzle 9 on a camera lens surface 3. At this stage the first electrovalve 6 remains closed, although the flow of washing liquid is also fed to the fluid inlet 19 of the air pump 5.

At a second stage of the cleaning cycle, that is, after a predetermined period of time has elapsed, the control unit closes the second electrovalve 7 such that the circulation of pressurized washing liquid through the second branch 12" and the dispensing of the same is interrupted. However, at this situation the air pump 5 is filled with washing liquid, whose pressure is applied to the plunger 14 while the first electrovalve 6 remains closed. The plunger 14 is displaced against the elastic action of the spring 15, increasing the volume of the variable volume fluid chamber 11 and reducing the volume of the variable volume compression chamber 10, thus, compressing a volume of air enclosed within the compression chamber 10. That is, the plunger 14 passes from its non-operative state, depicted in FIG. 3, to its operative state, depicted in FIG. 4. The air pump 5 is configured such that the fluid chamber 11 expands to compress the compression chamber 10 to pressurize a volume of air enclosed in that chamber 10 with an absolute pressure below 10 bar. The one-way valve 18 remains closed at this stage due to the pressure within the compression chamber 10 applied to the conical surface of that valve 18.

It can be appreciated that the cleaning system, and in particular the air pump 5 and the liquid pump 22 are adapted in such a manner that pressure of the washing liquid pumped by the liquid pump 22 overcomes the elastic force of the coil spring 15 to operate the air pump 5.

Once a certain level of air pressure is reached, the control unit opens the first electrovalve 6 so that the pressurized air is released through the air nozzle 8 and a blast of air is projected on the camera lens surface 3 with enough pressure to remove and dry any liquid remaining on that surface.

After a determined period of time, the control unit stops the liquid pump 22 so that the manometric pressure on the plunger 14 is released. Then, the elastic force of the coil spring 15 forces the plunger 14 to return to its original position (FIG. 3). At the same time that the compression chamber 10 expands, air from the exterior of the air pump 5 is suctioned through the one-way valve 18 filling the compression chamber 10 with non-compressed air.

Figure 5:
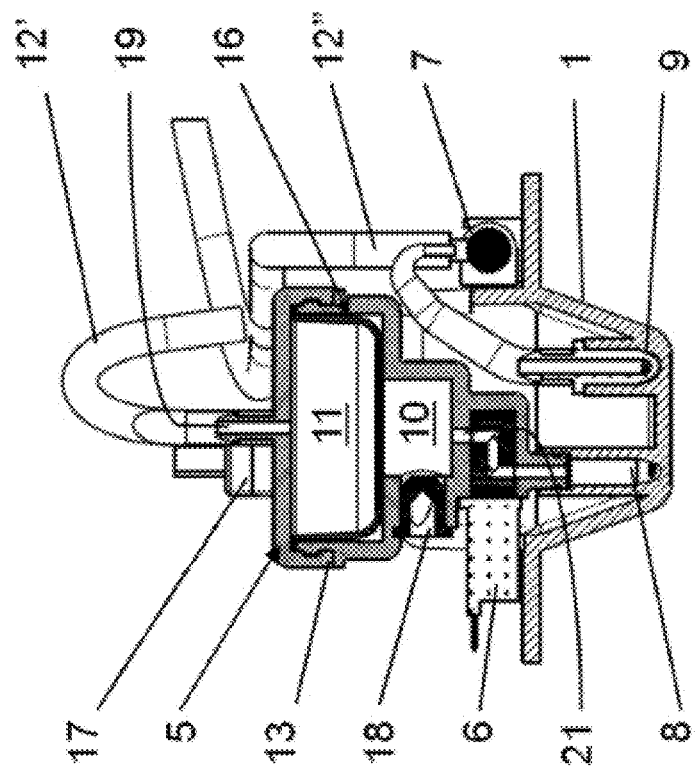
FIGS. 5 and 6 show a sectional view of a second embodiment of the air pump in a non-operative state and in an operative state, respectively.
Figure 6:
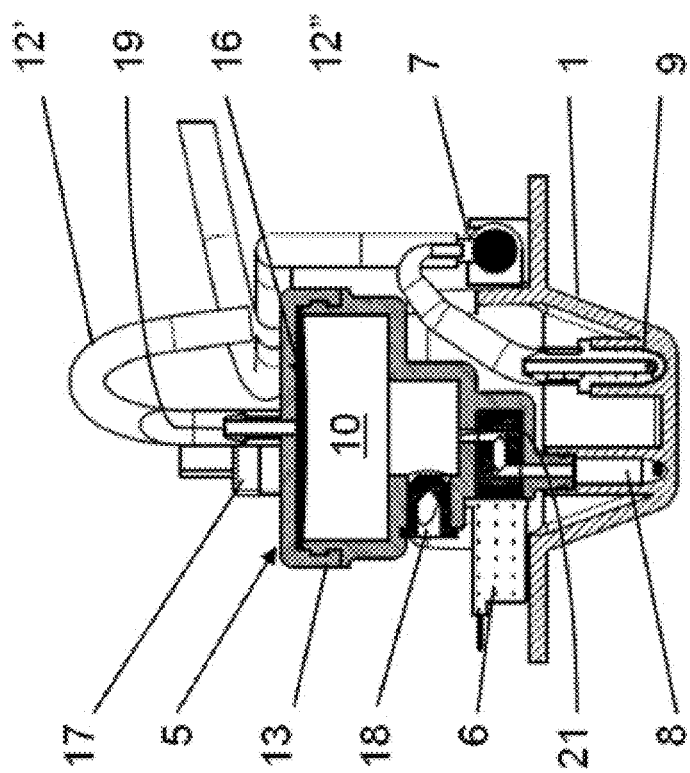

FIGS. 5 and 6 show a second embodiment of the air pump 5 where the air-fluid interface is an elastic element 16 instead of a plunger 14. Specifically, the elastic element 16 in this embodiment is an elastic membrane. The elastic membrane 16 is attached to the cylinder 13 and splits it into first and second portions such that the compression chamber 10 is defined by the first portion of the cylinder 13 and the elastic membrane 16 and the fluid chamber 11 is defined by the second portion of the cylinder 13 and the elastic membrane 16.

In FIG. 5, the air pump 5 is in a non-operative state, where the first and second electrovalves 6, 7 are closed and the liquid pump 22 is not supplying liquid to the cleaning system.

With both electrovalves 6, 7 closed and the liquid pump 22 activated to pump washing liquid from a washing liquid reservoir to the washing liquid conduit 12 generating a flow of washing liquid, the air pump 5 is filled with washing liquid, whose pressure is applied to the elastic membrane 16 while the first electrovalve 6 remains closed. The elastic membrane 16 deforms (FIG. 6), increasing the volume of the variable volume fluid chamber 11 and reducing the volume of the variable volume compression chamber 10, thus, compressing a volume of air enclosed within the compression chamber 10. The air pump 5 is configured such that the fluid chamber 11 expands to compress the compression chamber 10 to pressurize a volume of air enclosed in that chamber 10 with an absolute pressure below 10 bar.

It can be appreciated that the cleaning system, and in particular the air pump 5 and the liquid pump 22 are adapted in such a manner that pressure of the washing liquid pumped by the liquid pump 22 overcomes the elastic force of the elastic membrane 16 to operate the air pump 5.

Once the volume of pressurized air is discharged onto the surface 3 through the air nozzle 8, the control unit stops the liquid pump 22 so that the manometric pressure on the elastic membrane 16 is released. Then, the elastic force of the elastic membrane 16 causes the elastic membrane 16 to return to its original position.

Figure 7:
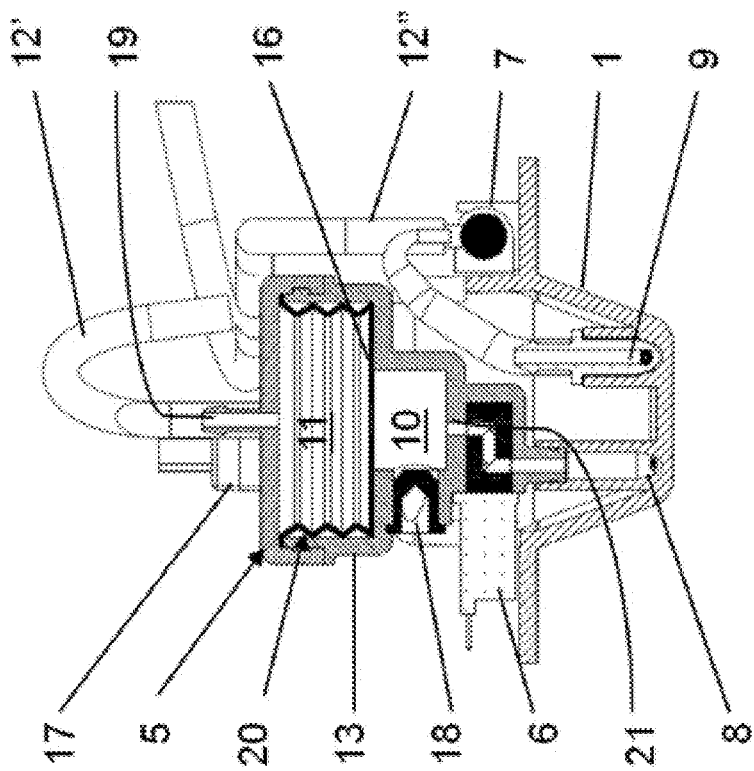
FIGS. 7 and 8 show a sectional view of a third embodiment of the air-pump in a non-operative state and in an operative state, respectively.
Figure 8:
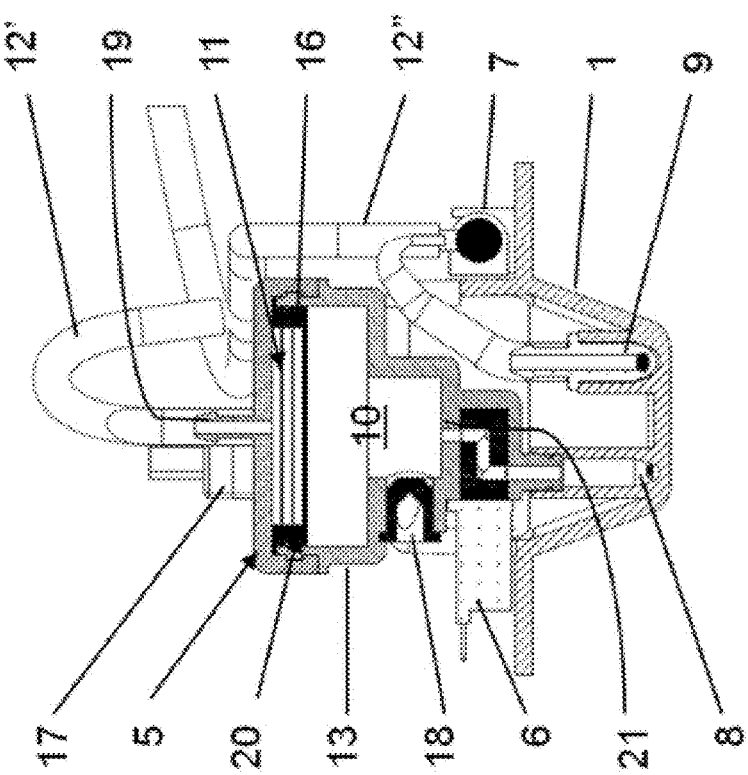

FIGS. 7 and 8 show a third embodiment of the air pump 5 where the air-fluid interface is an elastic element 16 having a bellow-shaped portion 20. The elastic element 16 is attached to the cylinder 13 and splits it into first and second portions such that the compression chamber 10 is defined by the first portion of the cylinder 13 and the elastic element 16 and the fluid chamber 11 is defined by the second portion of the cylinder 13 and the elastic element 16.

In FIG. 7, the air pump 5 is in a non-operative state, where the first and second electrovalves 6, 7 are closed and the liquid pump 22 is not supplying liquid to the cleaning system. In this state, the bellow-shaped portion 20 of the elastic element 16 is in a relaxed state.

With both electrovalves 6, 7 closed and the liquid pump 22 activated to pump washing liquid from a washing liquid reservoir to the washing liquid conduit 12 generating a flow of washing liquid, the air pump 5 is filled with washing liquid, whose pressure is applied to the elastic element 16 while the first electrovalve 6 remains closed. The bellow-shaped portion 20 of the elastic element 16 stretches out (FIG. 8), increasing the volume of the variable volume fluid chamber 11 and reducing the volume of the variable volume compression chamber 10, thus, compressing a volume of air enclosed within the compression chamber 10. The air pump 5 is configured such that the fluid chamber 11 expands to compress the compression chamber 10 to pressurize a volume of air enclosed in that chamber 10 with an absolute pressure below 10 bar.

It can be appreciated that the cleaning system, and in particular the air pump 5 and the liquid pump 22 are adapted in such a manner that pressure of the washing liquid pumped by the liquid pump 22 overcomes the elastic force of the elastic element 16 to operate the air pump 5.

Once the volume of pressurized air is discharged onto the surface 3 through the air nozzle 8, the control unit stops the liquid pump 22 so that the manometric pressure on the elastic element 16 is released. Then, the elastic force of the bellow-shaped portion 20 of the elastic element 16 causes the elastic element 16 to return to its original position.

A spring coil (not shown) may be arranged to assist the bellow-shaped portion 20 to cause the elastic element 16 to return to its original position. A first option consists of arranging said spring coil surrounding the bellow-shaped portion 20 such that the spring coil wounds around its creases. A second option consists of overmolding a spring coil with an adequate material, such as an elastomeric material, to form an elastic element 16 with a bellow-shaped portion 20 containing the spring coil. Other options of arranging the spring coil are not ruled out.

Figure 9:
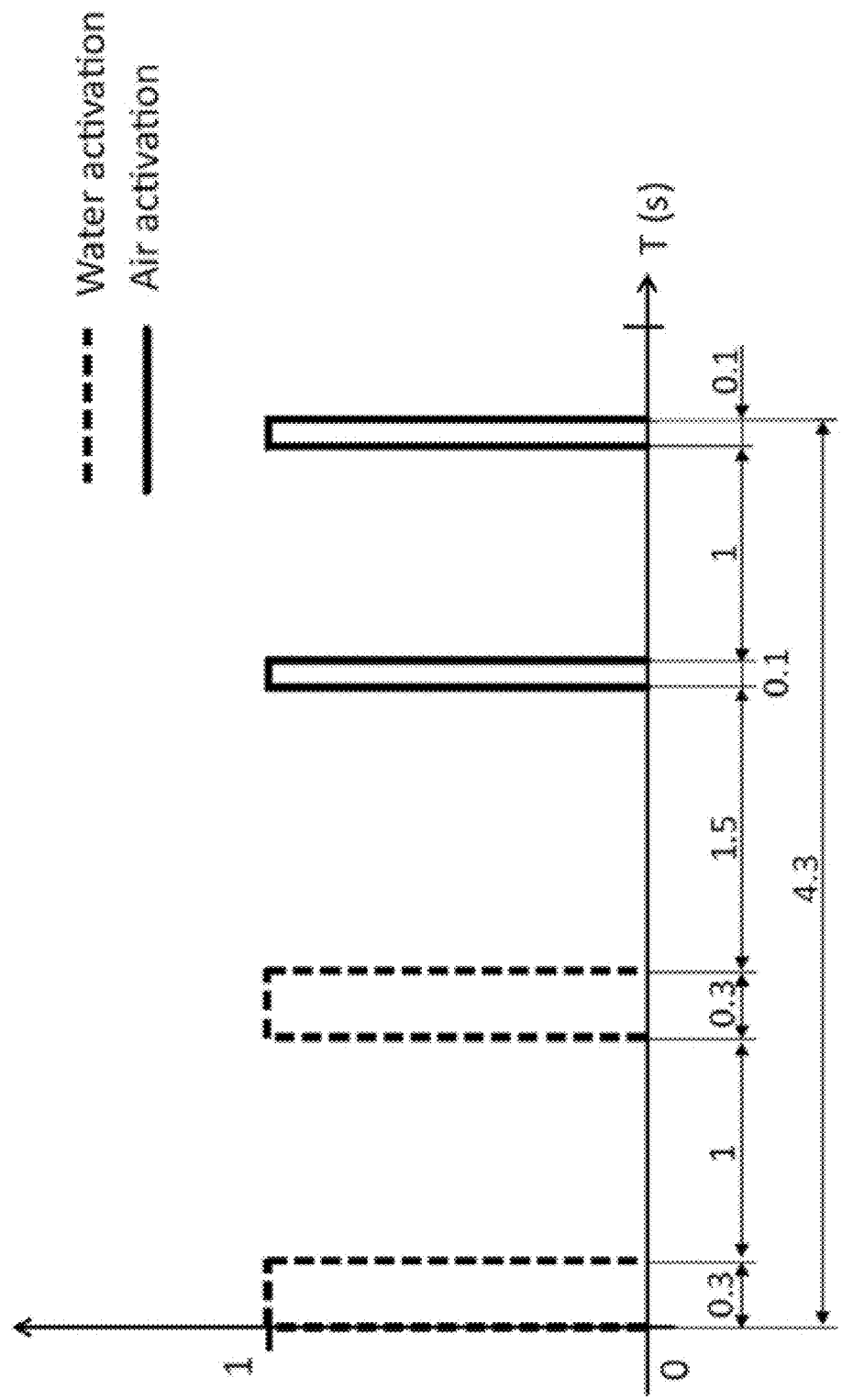
FIG. 9 is a graph representative of washing liquid and air activation sequence according to an exemplary embodiment of the invention.

Several cleaning sequences can be performed depending on the conditions of the optic lens to be cleaned. FIG. 9 is an example of a preferred cleaning sequence which can be implemented in the case of heavy dirt, such as dried mud or insects stuck on the lens surface 3. In the case of FIG. 9, the cleaning cycle includes at least two consecutive washing liquid discharges, each liquid discharge having a duration within the range 0.1 to 0.5 s (in this case 0.3 s), and with a time interval of is between these two liquid discharges. After, 1.5 s, at least two consecutive blasts of air of 0.1 s are dispensed with a time interval of 1 s. The duration of the complete cleaning sequence is 4.3 s.

Figure 10:
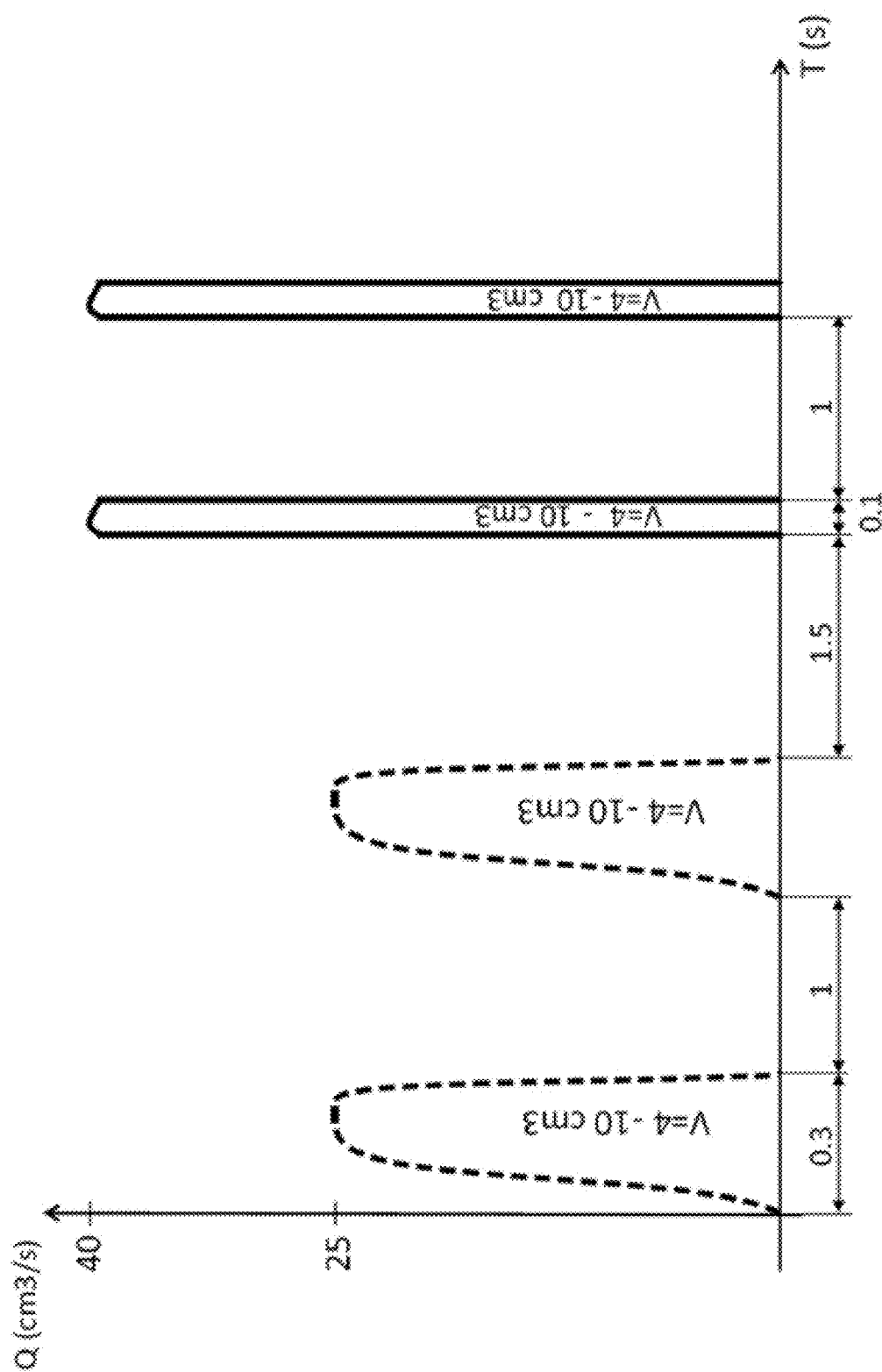
FIG. 10 is a graph representing the measured flow of washing liquid and air dispensed during the cleaning sequence of FIG. 7.

The measured volume of liquid and air per unit of time measured in the cleaning cycle of FIG. 9 is shown in FIG. 10.

In other conditions like light dirt, less volume of liquid and air is needed, so that less number of discharges are dispensed and the duration of the same is shorter.

In another preferred embodiment of the invention, the control unit can be programmed to operate the air nozzle 8 and liquid nozzle 9 to carry out different cleaning sequences. For example, the control unit can be programmed to operate the air nozzle 8 and liquid nozzle 9 independently from each other, to dispense only one or more bursts of washing liquid or to dispense only one or more blasts of air, which can be done simply by opening and closing the corresponding electrovalve 6, 7.

Additionally, in any of the embodiments of the FIGS. 3 to 8, the one-way valve 18 can be eliminated. For example, in the embodiment of FIG. 11, which is otherwise the same embodiment of FIGS. 3 and 4, the one-way valve 18 has been eliminated. The air admission during the air refill, is carried out through the air nozzle 8, and keeping the electrovalve 6 opened.

Additionally, in any of the embodiments of FIGS. 3 to 8 and 11, a plurality of fluid inlets may be incorporated rather than a single fluid inlet 19, such as, for example, two fluid inlets 19,19' connected to a respective liquid pump (not shown in the figure). For example, in the embodiment of FIG. 12, which is otherwise the same embodiment of FIG. 11, there are two fluid inlets 19,19'. The technical effect of having two fluid inlets connected to a respective liquid pump, or alternately to a plurality of pumps, is that the cylinder compression time is reduced.

As shown in FIG. 13, in some preferred embodiments of the invention, the cleaning system has a plurality of air nozzles, which in the embodiment shown includes two individual air nozzles 8,8', and a flow distributor 24 connected between the air pump 5 and the plurality of air nozzles, such as the two air nozzles 8,8'. The flow distributor 24 may comprise the electrovalve (solenoid valve) 6 provided with one or more outlets, where each outlet is connected with one of the air nozzles 8,8' for cleaning one or more sensor surface. During compression phase all the outlets are closed, and during air ejection phase one or more (e.g. two) outlets are open.

Figure 13A:
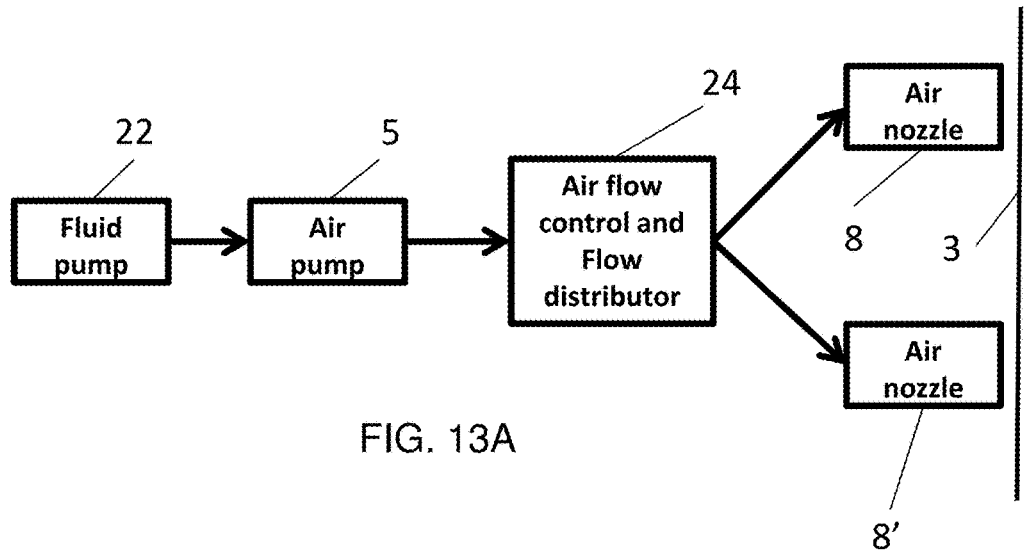
FIGS. 13A-13B show schematic representations of two additional embodiments of the cleaning system of the invention, incorporating a flow distributor and two individual air nozzles.
Figure 13B:
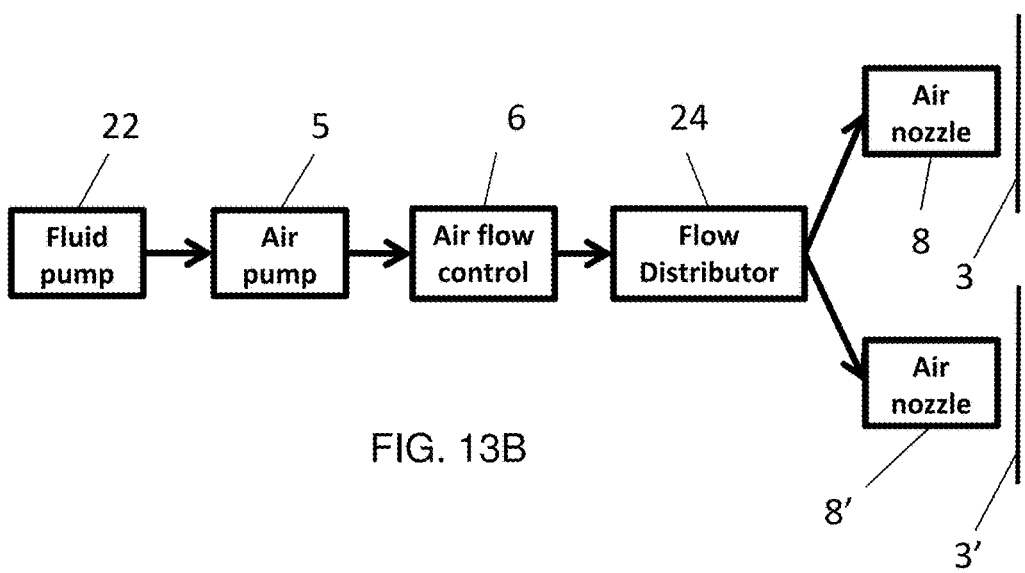

The solenoid valve 6 can be integrally formed with the flow distributor 24 (FIG. 13A), or it can be implemented as an external valve (drawing 13B). The flow distributor 24 may be used to direct pressurized air to a plurality of output nozzles. The plurality of output nozzles (e.g. 8, 8') may be directed to one sensor surface 3 (FIG. 13A), such as to different portions or regions of one sensor surface, or alternately, may be directed to a plurality of different sensor surfaces 3, 3' (FIG. 13B). For example, to dry more than one sensor surface, the flow distributor 24 would direct pressurized air through multiple output nozzles towards multiple sensor surfaces 3,3', such as the two output nozzles 8,8'.

Figure 14:
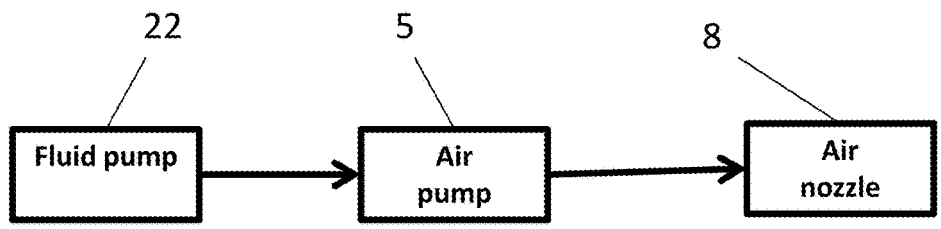
FIG. 14 shows a schematic representation of another embodiment of the cleaning system without air flow control means.

FIG. 14 shows an embodiment without air flow control means, that is, without solenoid valve 6, so that the air pump 5 is directly connected with the air nozzle 8. When the liquid pump 22 is activated, air is pushed by a cylinder piston or membrane, and the air comes out of the air nozzle 8 with enough pressure to dry a sensor surface.

Additionally, in any of the embodiments of the previous figures, the air nozzle can be constructed as a telescopic nozzle. For example, in the embodiment of FIG. 15 the cleaning system includes a telescopic air nozzle 25 incorporating an extendable air nozzle 8. The telescopic air nozzle 25 comprises a cylinder 26 and a plunger 27 housed within the cylinder 26, where the plunger 27 divides the cylinder 26 internally in two chambers 26a,26b, and where one of the chambers 26a is connected with a first inlet (29) in turn connected directly with the fluid pump output (22). The plunger 27 is hollow and it is connected with a second inlet (28) which is in turn connected with the air flow control device 6 output.

Figure 15A:
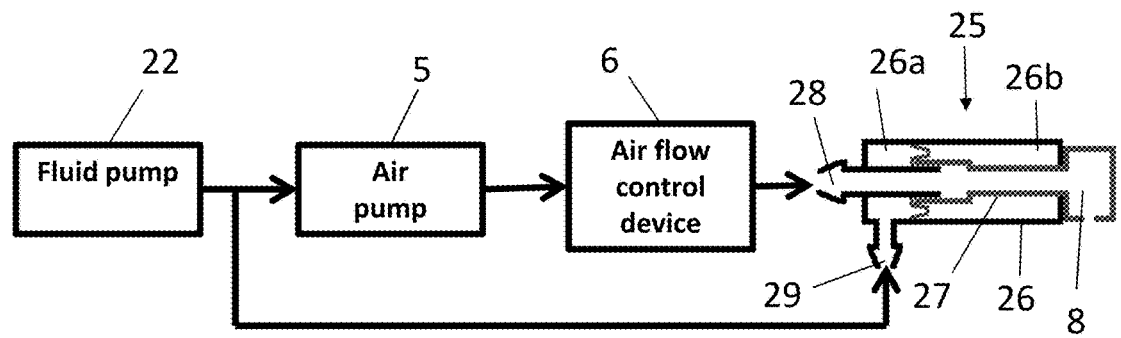
FIGS. 15A-15C show schematic representations of another embodiment of the cleaning system of the invention incorporating a telescopic air nozzle.
Figure 15B:
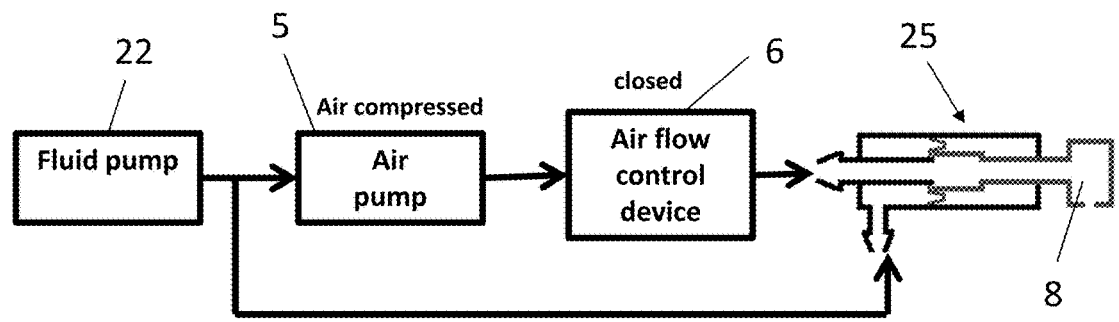
Figure 15C:
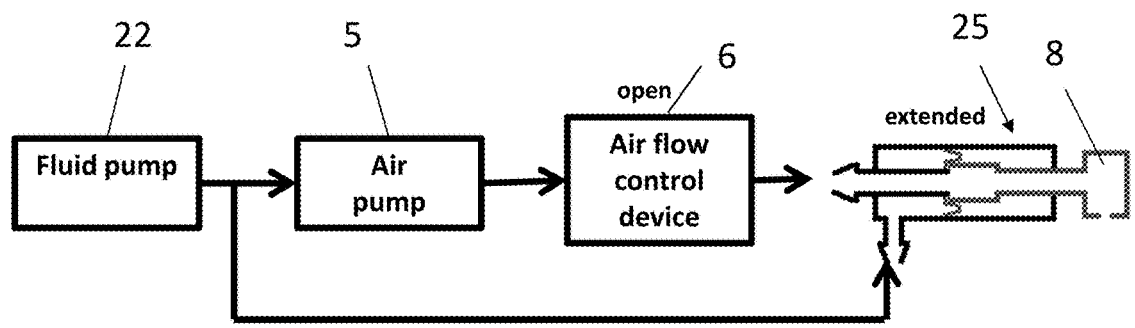

For ejecting pressurized air through the air nozzle 8, the fluid (liquid) pump 22 provides pressurized liquid both to the air pump 5 and to the telescopic air nozzle 25 through the inlet 29. Then, the plunger 27 and the air nozzle 8 extends outwardly (FIG. 15B), and while it is extended, the air pump supplies pressurized air through the inlet 28 and through the interior of the plunger 27 (FIG. 15C).

In the embodiment of FIGS. 16A-16B the cleaning system incorporates a reversible fluid pump 22', which operates in the same manner during operation as previously described during the compression and air ejection phases (FIG. 16A). However, during the air refilling phase (FIG. 16B), the reversible fluid pump 22' reverses its function to work as a vacuum pump.

In the embodiment of FIG. 17, the system incorporates a flow distributor 24 connected between the fluid pump 22 and the air pump 5, and an output of the flow distributor 24 is connected with the liquid nozzle 9, so that the flow distributor 24 separates the liquid circuit and the air circuit.

Alternatively, and as shown in FIG. 18, instead of a flow distributor 24, the fluid pump 22 can consist of a dual fluid pump, that is, a fluid pump having two individual fluid outputs, such as each output supplies pressurized fluid to different fluid circuits. In the embodiment of FIG. 18, the dual fluid pump 22 has two fluid outputs, one of them is connected with the liquid nozzle 9, and the other one is connected with the air pump 5.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

What is claimed is:

1. An air pump adapted for use in a system constructed to clean a sensor surface, the air pump comprising:
   a pump body defining a pump chamber, the pump body having a liquid opening, an air outlet, and an air inlet disposed proximate to the air outlet;
   an air-fluid interface element disposed within the pump chamber having an inlet side disposed toward the liquid opening and defining in-part a variable liquid chamber, and an outlet side disposed toward the air outlet and defining in-part a variable compression chamber;
   a return member, the return member configured to apply a return force to the air-fluid interface element;
   an electrovalve adapted to controllably isolate air flow emitted from the air outlet;
   a one-way valve that is configured to selectively allow air into the variable compression chamber through the air inlet and facilitate the storage of a volume of pressurized air when the electrovalve is closed, and wherein the volume of pressurized air is discharged through the air outlet when the electrovalve is open; and
   a liquid pump in fluid communication with the liquid opening and configured to supply a flow of pressurized liquid to the variable liquid chamber.

2. The air pump according to claim 1, wherein the flow of pressurized liquid into the variable liquid chamber varies the volume of the chamber between the outlet side and the air outlet to generate the volume of pressurized air with an absolute pressure value below 10 bar.

3. The air pump according to claim 2, wherein the flow of pressurized liquid has a manometric pressure in the range of 0.5 bar to 9 bar at a liquid pump outlet.

4. A system comprising:
   an air pump including a pump body defining a pump chamber including a washing liquid chamber and an air compression chamber, the pump body having a liquid opening in fluid communication with the washing liquid chamber, an air outlet, and an air inlet disposed proximate to the air outlet, wherein the air outlet and air inlet are in fluid communication with the air compression chamber;

an air-fluid interface element disposed within the pump chamber having a first side defining in-part the washing liquid chamber and an opposite second side defining in-part the air compression chamber;

a return member, the return member configured to apply a return force to the air-fluid interface element;

a washing liquid nozzle arranged to discharge a washing liquid;

an air nozzle;

a conduit in direct fluid communication with and extending between the liquid opening and the washing liquid nozzle; and an electrovalve adapted to controllably isolate air flow through the air outlet.

5. The system according to claim 4, further comprising:
a sensor having a sensor surface, the air nozzle configured to discharge compressed air from the pump onto the sensor surface.

6. The system according to claim 5, further comprising:
the washing liquid nozzle being arranged to discharge the washing liquid onto the sensor surface; and
a liquid flow control device communicating with the washing liquid nozzle for controlling the flow of the washing liquid therethrough.

7. The system according to claim 6, further comprising:
a liquid pump adapted to simultaneously deliver the washing liquid to the washing liquid nozzle and the liquid opening while the electrovalve is open; and
a control unit operatively associated with at least the air pump and the liquid pump for commanding their operation, and wherein the control unit is adapted to carry out at least one cleaning cycle.

8. The system according to claim 6, further comprising:
a housing having an opening adapted to fit the sensor surface, wherein at least one of:
(i) the air nozzle is fixedly attached to the housing;
(ii) the liquid nozzle is fixedly attached to the housing;
(iii) the air nozzle is movably attached to the housing, the air nozzle being configured to move from a non-operative position to an operative position such that in the non-operative position the air nozzle is at least partially hidden in the housing;
(iv) the liquid nozzle is movably attached to the housing, the liquid nozzle being configured to move from a non-operative position to an operative position such that in the non-operative position the liquid nozzle is at least partially hidden in the housing;
(v) the air pump is attached to the housing;
(vi) an air control device adapted to control the flow of air is attached to the housing, wherein the air control device is in communication with and is disposed between the air nozzle and the air pump; and
(vii) the liquid flow control device is attached to the housing.

9. A system comprising:
a pump body defining a pump chamber, and including a liquid opening, an air inlet, and an air outlet;
an air-fluid interface element disposed in the chamber and slideably sealed against the pump body, the air-fluid interface element disposed between and defining in part a fluid chamber of the pump chamber and an air chamber of the pump chamber, the liquid opening being in communication with the fluid chamber, and the air inlet and air outlet being in communication with the air chamber;
a return member configured to bias the air-fluid interface element toward the fluid chamber;
an air nozzle adapted to emit air upon a sensor surface;
a liquid nozzle adapted to emit liquid upon the sensor surface;
a liquid electrovalve in communication with the liquid nozzle and adapted to controllably isolate the flow of liquid through the liquid nozzle;
a liquid conduit in direct fluid communication between the liquid opening and the liquid electrovalve for the simultaneous flow of liquid to the liquid opening and the liquid electrovalve; and
an air electrovalve in communication with the air nozzle and adapted to controllably isolate the flow of air through the air nozzle, wherein the air electrovalve is open during the simultaneous flow of liquid to the liquid opening and the liquid electrovalve.

* * * * *